Jan. 8, 1935. B. Y. KINZEY 1,987,258
REFRIGERATING APPARATUS
Filed Feb. 11, 1933
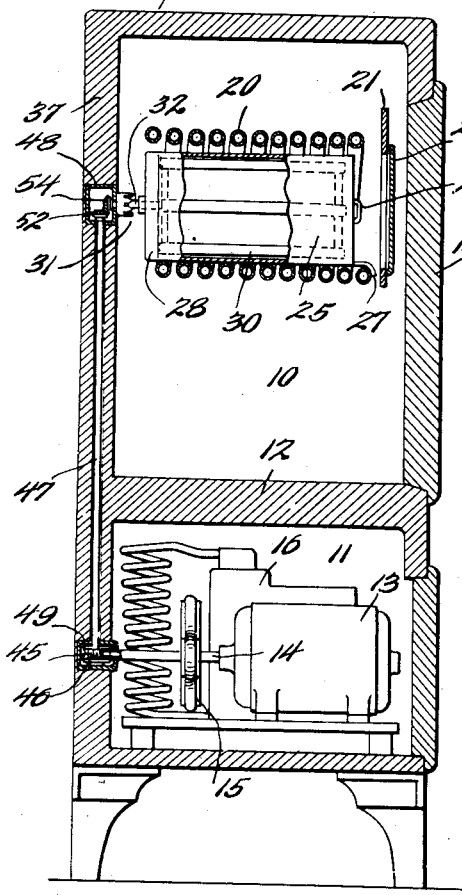
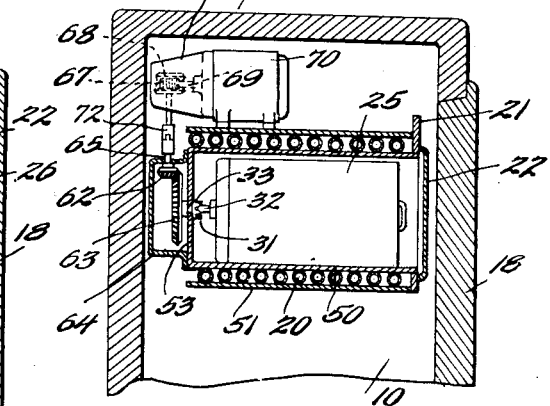
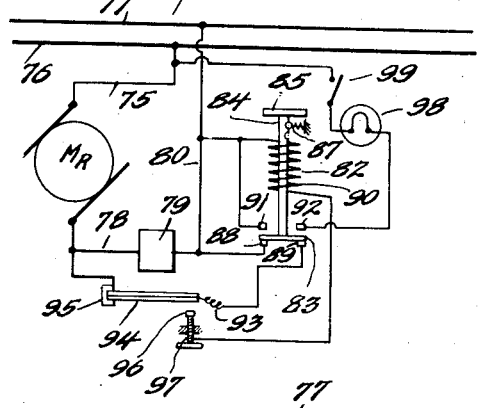
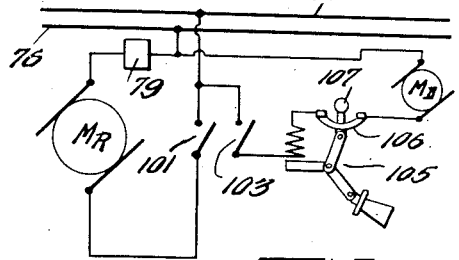
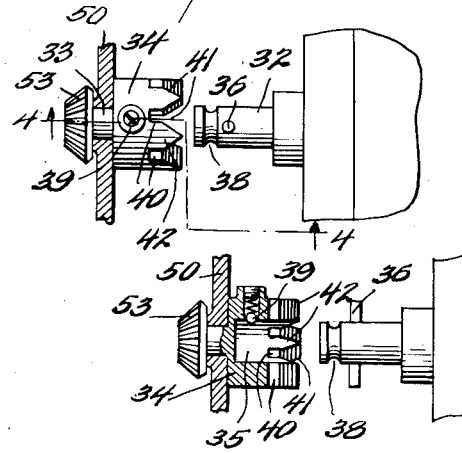

Patented Jan. 8, 1935

1,987,258

UNITED STATES PATENT OFFICE 1,987,258

REFRIGERATING APPARATUS

Bertram Y. Kinzey, Berea, Ohio

Application February 11, 1933, Serial No. 656,336

12 Claims. (Cl. 62—116)

This invention relates to refrigerating apparatus and more particularly to refrigerating apparatus of the domestic type embodying a special freezing compartment which is adapted to receive trays for the freezing of ice cubes and the like. It has heretofore been proposed to employ in freezing compartments in such refrigerators a special form of container for the chilling or freezing of dessert mixtures, the container being provided with means such as the conventional dasher for agitating the mixture during freezing to improve the consistency and uniformity of the chilled or frozen product.

It is the principal object of the invention to provide a simple and inexpensive construction affording a mechanical drive for the agitating means in such a dessert container, the motive force being derived either from the motor which serves to compress and circulate the refrigerating medium or from a separate motor more or less permanently associated with the refrigerating unit and utilized primarily for the operation of the agitating means.

It is a feature of the invention that the arrangement lends itself particularly to a permanent installation which does not detract from the appearance or the efficiency of the refrigerator as a whole and which may be placed in operation with the least effort and inconvenience on the part of the household user.

It is a more specific object of the invention to provide in a household refrigerator of the type employing a refrigerating compartment adapted to receive ice trays, a dessert container in which special materials such as ice cream may be frozen, the container employing an agitating device supported for rotation therein and arranged for coupling with a driving means at the rear of the freezing compartment. In accordance with the present invention the coupling of the agitating means may be effected simply by the introduction of the dessert container into the freezing compartment. It is a further object of the invention to provide a coupling of the character described which is capable of transmitting a positive drive and in which the members of the coupling, if misaligned upon the introduction of the container into the freezing compartment, are automatically rotated into the correct relative positions for proper engagement thereof and are yieldingly retained in such operative engagement against unintentional displacement.

It is a further object of the invention to provide apparatus for the freezing of special materials applicable to various types of household refrigerating units including a device for automatically terminating the operation of the agitating means when the mixture to be frozen has reached the desired consistency and for giving a visual indication when this point in the freezing operation is reached. In the event the refrigerant motor of the unit is utilized to drive the agitating means, the usual temperature responsive switch for controlling the operation of the motor is by-passed during the operation of the agitating means so that the agitation will not cease in response to the establishment of a minimum temperature within the unit, this by-pass being automatically rendered inoperative when the mixture being frozen reaches the desired consistency.

Further objects and features of the invention will appear from the following description, taken in connection with the accompanying drawing, in which:

Figure 1 is a vertical sectional view of one type of refrigerating unit illustrating the manner in which the invention may be applied thereto;

Figure 2 is a fragmentary sectional view corresponding to Figure 1 of a slightly different type of refrigerating unit illustrating a different arrangement of the mechanism which forms the subject matter of the present invention;

Figure 3 is a view in elevation illustrating a form of coupling suitable for use in the general arrangements shown in Figures 1 and 2;

Figure 4 is a section on the line 4—4 of Figure 3;

Figure 5 is a wiring diagram suitable for use with the construction shown in Figure 1 of the drawing in which a single motor is utilized both for refrigerating purposes and for agitating purposes; and Figure 6 is a wiring diagram applicable to an arrangement in which a separate motor is employed for agitating the mixture to be frozen.

To facilitate an understanding of the invention, the several arrangements which have been selected for the purpose of illustrating the invention will be described in detail. It will nevertheless be understood that by the use of specific language it is not thereby intended to limit the scope of the invention but that such alterations and modifications of the various embodiments of the invention shown herein are contemplated as fall within the spirit and scope of the appended claims.

Referring first to the arrangement shown in Figure 1 of the drawing, it will be observed that the conventional refrigerating unit of substantially rectangular shape is separated into two portions 10 and 11 by a horizontally extending partition 12, the portion 10 being utilized for the storing of perishable food stuffs and the portion 11 serving as a housing for a refrigerant motor 13, the shaft 14 of the latter being provided with a belt drive indicated generally at 15 for operating the conventional compressor 16. The details thus far described have no particular significance so far as the present invention is concerned and may be constructed in various ways.

The portion 10 of the refrigerating unit is accessible from the front of the unit through a door 18 which may be hinged in the usual manner, not only for the introduction of food stuffs, but for the introduction of the usual ice trays in a special freezing compartment defined generally by the refrigerant coils 20. In the type of unit shown in this figure the ice trays are introduced in the compartment through an opening in a front panel 21 which may be provided with a door 22, the lowermost tray resting directly on the lower portion of the refrigerant coils 20 and serving to support several additional trays superimposed thereon. When it is desired to chill or freeze a special mixture such as a dessert, the usual ice trays may be removed from the freezing compartment and the mixture introduced in a container 25 which may be conveniently referred to as a dessert container. The container may be of any size or shape and need not be of sufficient size to substantially fill the freezing compartment in which it is placed, although it is so shown in the drawing. A handle 26 provided on the forward end of the container 25 serves to facilitate introduction and withdrawal thereof and the rear end of the container is closed by means of a lid 28 which may be provided with liquid sealing means if desired for preventing leakage of the contents from the container. An agitating means 30, for instance the conventional rotatable dasher, is suitably journalled at opposite ends of the container, the rear journal being formed in or supported on the lid 28 of the container, so that when the container is in position in the freezing compartment, the dasher is freely rotatable about an axis extending substantially horizontally, the rearward portion 32 of the dasher preferably extending outwardly through the container lid.

A shaft 33 is journalled in the rear wall 37 of the refrigerator, and this shaft, together with suitable means indicated generally at 31 and shown in particular in Figures 3 and 4 of the drawing for coupling the shaft to the dasher, constitutes the driving means for the latter. It will be observed that the shafts 32 and 33 are in axial alignment and thus with any conventional type of coupling the shafts may be operatively connected by the simple expedient of introducing the container 25 in position within the freezing compartment or chamber, the container being thrust rearwardly in the compartment until the coupling is properly engaged. While any type of coupling means may be used, I prefer to utilize a coupling affording a positive drive as distinguished from a frictional coupling, this coupling being so constructed that regardless of the relative angular disposition of the two parts of the coupling when the container is introduced, these parts will be automatically rotatively aligned so that proper engagement may be effected without difficulty.

One form of such a coupling is shown in Figures 4 and 5 of the drawing, in which for purpose of illustration the female member 34 of the coupling is shown as secured to or formed on the driving shaft 33, although it is obvious that the parts might be reversed and the member 34 carried by the shaft 32. The member 34 is centrally apertured as at 35 to receive more or less loosely the end of the shaft 32, the latter being grooved circumferentially as indicated at 38 for engagement by a spring pressed detent 39 supported in the wall of the member 34. The latter is further provided with a plurality of axially extending recesses 40 spaced at intervals about the circumference of the member 34, the outer end of these recesses being cut away as shown at 41 to provide intermediate the recesses a plurality of substantially V-shaped projections 42. One or more pins 36 are carried by the shaft 32 and extend radially outward therefrom, these pins being arranged to pass into the recesses 40 and being retained in such recesses against unintentional displacement by means of the spring pressed detent 39 hereinbefore mentioned.

It will be observed that as the shaft 32 is moved toward the coupling member 34, a positive clutching engagement will be invariably effected regardless of the initial relative angular position of the two members of the coupling. For instance, if the pins 36 should not be aligned with the slots 40, on engagement of these pins with the V-shaped projections 42 either the coupling member 34 or the shaft 32 will be cammed in one direction or the other to effect relative rotation of the parts to proper aligning position. Thus in order to effect driving connection with the agitating means 30 it is merely necessary to position the container within the freezing compartment and thrust it toward the rear, the self-aligning coupling or clutch obviating any difficulty which might otherwise arise to prevent the establishment of the driving connection.

In order that there shall be no tendency to displace the container 25 as the mixture begins to stiffen and as the torque applied to the dasher is correspondingly increased, a suitable retaining element 27 may be secured to the container, this element being provided with a curved outer end for engagement with one of the refrigerant coils 20.

In the arrangement shown in Figure 1 of the drawing the refrigerant motor 13 is also used to drive the agitating means and for this purpose the shaft 14 of the motor is extended into the rear wall 37 of the refrigerator and is provided at its rear end with a worm 45, the latter being supported in driving engagement with a worm gear 46 carried by the lower end of shaft 47 extending upwardly within the rear wall 37 of the refrigerator and journalled therein in any convenient manner. It may be mentioned here that the arrangement shown is equally applicable where it is desired to provide a separate motor for driving the agitating means. Thus if the separate agitating motor occupies the position shown by the motor 13 in the drawing, the belt gearing 15 will, of course, be eliminated.

The gearing 45, 46 is preferably enclosed within a housing 49 and a similar housing 48 is provided adjacent the upper end of the shaft 47 to accommodate the cooperating bevel gears 52 and 54 secured to shaft 47 and to shaft 33 respectively. Various other types of gearing may be employed but it is advisable to provide gearing affording a substantial reduction in the speed of rotation of the agitating means 30. It will be apparent that if the motor 13 is located above rather than below the refrigerating portion 10 of the unit, the construction can be readily modified to afford the requisite drive for the agitating means.

Referring now to Figure 2 of the drawing, it will be seen that a modified construction is disclosed, the refrigerating unit shown being similar to that disclosed in Figure 1 of the drawing with the exception that the freezing compartment or chamber 25 is defined by a casing 50 lying within the refrigerant coils 20. Furthermore, the refrigerant coils are at least partially surrounded by an outer casing 51. The casing 50, which in this construction may be conveniently referred to as the freezing compartment, is provided with a rear wall 53 and with an opening at its forward end which is normally closed by the usual hinged door 22.

The compartment 50 is designed to receive one or more ice making trays which may be replaced when desired by the dessert container 25, which is preferably constructed substantially as described hereinbefore with reference to Figure 1 of the drawing. Thus the shaft 32 of the container 25 is arranged to project through a bearing in the lid 28 of the container and is provided with coupling means whereby the dasher may be driven from the shaft 33, the latter being journalled in the rear wall 53 of the compartment rather than in the rear wall of the refrigerating unit as in the construction shown in Figure 1. As mentioned hereinbefore, the coupling in question may be of any desired type but is preferably constructed in the manner shown in Figures 4 and 5 of the drawing so that when the container is placed in position within the compartment 50, the dasher is coupled for rotative movement and is yieldingly retained against unintentional axial displacement.

In this form of the invention the rearward end of the shaft 33 carries a bevel gear 63 meshing with a bevel gear 62, these gears being journalled in a suitable housing 64 secured to the rear wall 53 of the compartment 50. A shaft 65 is journalled in the upper wall of the housing 64 and carries at its lower end the bevel gear 62 and at its upper end the worm gear 67, the latter meshing with a worm 68 carried on the shaft 69 of a driving motor 70. For convenience in assembling the motor and gearing, a conventional shaft coupling 72 may be interposed between the ends of shaft 65.

The motor 70 is preferably supported in any convenient manner on the upper portion of the outer casing 51 surrounding the refrigerant coils 20 and carries at its rearward end a housing 71 for encasing the gears 67, 68. If the space permits the construction may obviously be modified to support the motor 70 at some other position within the unit, for instance at the side or below the freezing compartment, the operation of the construction being quite similar to that shown in Figure 1.

Referring now to Figure 5 of the drawing, which shows a wiring diagram suitable for use in an arrangement such as that shown in Figure 1 in which a single motor is used to drive the agitating means and to compress the refrigerant, it will be observed that this motor, indicated in the drawing as $M_R$, is supplied with current at one side through the conductor 75 from one of the supply mains 76, 77. At its other side the motor is connected by the conductor 78 through a thermostatic switch 79 and by the conductor 80 back to the supply mains. This is the conventional arrangement, and for convenience in illustration the thermostatic switch 79 is shown diagrammatically, it being understood that this switch is of the type which is automatically opened in response to temperature decrease within the refrigerating unit to discontinue the operation of the refrigerant motor when a desired minimum temperature has been established.

A switch 82 is provided for regulating the operation of the thermostatic switch 79 when the unit is being used for the freezing of desserts, the switch 82 preferably consisting of a contact member 83 carried by a spindle 84, the latter being slidably supported in the front wall of the unit, and being manually operable by depression of the button 85 carried thereby to the position in which it is shown in Figure 5 of the drawing. In this position, the contact member 83 bridges the contacts 88 and 89, whereas in its outer position, into which it is automatically shifted by energization of the winding 90, the contact member 83 bridges the contacts 91 and 92, the switch being retained in either position against unintentional displacement by a yielding detent 87.

It will be observed that the contact 88 is connected to the conductor 80 and to that side of the thermostatic switch 79 which is remote from the refrigerant motor $M_R$, whereas the contact 89 is connected through a conductor including a flexible connection 93 to one end of a bi-metallic thermal switch 94 of conventional type, the other end of the switch element being fixedly supported as at 95. Thus with the control switch 82 in the position shown in Figure 6 of the drawing, the thermostatic switch 79 which ordinarily controls the operation of the refrigerant motor will be by-passed by the circuit including the contacts 88 and 89, the switch contact member 83, and the thermal switch element 94, the refrigerant motor being thus supplied with current during the entire time in which the dessert mixture is being frozen, so that the agitating means for this mixture will be driven regardless of the temperature which is reached within the refrigerating unit.

During the process of freezing, the mixture thickens and the load on the motor $M_R$ becomes correspondingly greater, with the result that the heat developed in the thermal element 94 on passage of current therethrough is continually increased, causing this element to flex toward a contact 96 which may be initially set toward or away from the thermal element 94 by any convenient means such as the adjusting screw 97. It may be assumed that at the time the mixture reaches the desired consistency, the temperature within the unit will be quite low and the thermostatic switch 79 will have been opened, so that all of the current supplied to the motor $M_R$ will pass through the thermal element 94. Thus when the desired degree of stiffness of the mixture is obtained the thermal element 94 will engage the contact 96, the degree of flexure of the element 94 necessary to effect this engagement being determined in advance by proper setting of the adjusting screw 97. When this contact is made, a path for the current flowing through the motor $M_R$ will be provided between the thermal element 94 and the conductor 80 through the winding 90, and the energization of this winding will shift the slidable spindle 84 to its outer position, thus breaking the connection between the contacts 88 and 89 and establishing a connection between the contacts 91 and 92. When the first mentioned connection is broken, the by-pass afforded by the thermal element 94 about the thermostatic switch 77 will be opened and the thermostatic switch will thereafter control the operation of the motor $M_R$ in the usual manner, and presumably at this point the motor will cease operation until the temperature within the refrigerating unit rises to an extent sufficient to require resumption of operation. At the same time, the connection thus afforded between the contacts 91 and 92 will serve to energize a signal 98 which may take the form of a lamp, thus notifying the operator that the mixture has reached the preselected state of consistency. In order that the signal 98 will not operate except when the refrigerator is being used for the freezing of dessert mixtures or the like, the connection between the signal and the supply mains may include a manually operable switch 99 located in a convenient position on the face of the refrigerator, the switch 99 being closed only when dessert mixtures are to be frozen.

Referring now to Figure 6 of the drawing, it will be observed that this arrangement is of the type in which separate motors $M_R$ and $M_D$ are employed for operating respectively the refrigerating apparatus and the dasher or other agitating means in the dessert container. The construction includes the thermostatic element 79, of the conventional type described hereinbefore, arranged in series with the motor $M_R$ and with the usual switch 101 for manually controlling the operation of the motor $M_R$, a second switch 103 being provided for initiating operation of the motor $M_D$ when it is desired to freeze a dessert mixture.

The switches 101 and 103 and a third switch 105 are preferably located on the front panel of the refrigerator, and the switch 105, while represented as being of the conventional overload circuit breaker type, may be of any other suitable construction. Switch 105 serves to open the circuit through the motor $M_D$ when the load on that motor exceeds a predetermined amount, this switch being so adjusted as to open the circuit when the mixture reaches a predetermined consistency. In this construction the movable element 106 of the overload switch carries an indicating device 107 which may be positioned immediately behind the panel in such manner that upon the opening of the circuit by movement of the member 106, the indicating element 107 is shifted into a position where it may be viewed through a suitable aperture in the panel, thus warning the operator that the desired consistency has been attained.

Having thus described the invention, what is claimed as new and desired to be secured by Letters Patent is:

1. In refrigerating apparatus for domestic use, the combination with an ice tray receiving chamber having a front opening through which ice trays may be introduced, of a dessert container fitting within said chamber, agitating means within said container, and means positioned at the rear of said chamber for effecting a driving coupling with said agitating means to operate the latter, said last named means including a self-aligning positive clutch.

2. In a self-cooling refrigerator having a freezing compartment for receiving ice trays, the combination with a dessert container, of agitating means supported for rotation within the container, a driving shaft provided with a mechanical coupling member supported for rotation within and at the rear of the refrigerator, and a coacting mechanical coupling member operatively connected with said agitating means and carried by said container at the rear thereof, said coupling members being so relatively positioned in the refrigerator and on the container that introduction of the container into the freezing compartment of the refrigerator serves to place said members in operative coupling relation.

3. In refrigerating apparatus for domestic use, the combination with an ice tray receiving chamber having a front opening through which ice trays may be introduced, of a dessert container fitting within said chamber, agitating means within said container, a driving shaft supported for rotation about a fixed axis at the rear of said chamber, and coacting mechanical clutch members detachable by relative axial movement operatively associated with said shaft and agitating means respectively, said clutch members being so relatively positioned that said agitating means may be placed in operative relation with said driving shaft by introduction of the container within the chamber.

4. In refrigerating apparatus for domestic use, the combination with an ice tray receiving chamber having a front opening through which ice trays may be introduced, of a dessert container fitting within said chamber, agitating means within said container, a driving shaft supported for rotation about a fixed axis at the rear of said chamber, coacting mechanical clutch members detachable by relative axial movement operatively associated with said shaft and agitating means respectively, said clutch members being so relatively positioned that said agitating means may be placed in operative relation with said driving shaft by introduction of the container within the chamber, and yielding means supported on one of said clutch members and engaging the other of said clutch members to prevent unintentional detaching movement thereof.

5. In refrigerating apparatus for domestic use, the combination with an ice tray receiving chamber having a front opening through which ice trays may be introduced, of a desert container fitting within said chamber, agitating means within said container, a driving shaft supported for rotation about a fixed axis at the rear of said chamber, coacting mechanical clutch members detachable by relative axial movement operatively associated with said shaft and agitating means respectively, said clutch members being so relatively positioned that said agitating means may be placed in operative relation with said driving shaft by introduction of the container within the chamber, said clutch members including interlocking elements affording a positive driving connection, and means acting between said clutch members to relatively rotate the same to effect alignment of said elements as the clutch members are moved to operative engaging position.

6. In refrigerating apparatus for domestic use of the type employing a freezing compartment comprising rear and side walls surrounded by refrigerant coils and having a front opening through which ice trays may be introduced, the combination with a dessert container for introduction within said compartment, of rotatable agitating means within said compartment, driving means for said agitating means supported for rotation in the rear wall of said compartment, said driving means including a mechanical coupling member, and a coacting mechanical coupling member connected with said agitating means and disposed at the rear of said container, said coupling members being so relatively positioned that said agitating means may be operatively connected with said driving means by introducing the container in the compartment.

7. In refrigerating apparatus for domestic use of the type employing a freezing compartment comprising rear and side walls surrounded by refrigerant coils and having a front opening through which ice trays may be introduced, the combination with a dessert container for introduction within said compartment, of rotatable agitating means within said compartment, driving means for said agitating means supported for rotation in the rear wall of said compartment, said driving means including a coupling member, a coacting coupling member connected with said agitating means and disposed at the rear of said container, whereby said agitating means may be operatively connected with said driving means by introducing the container in the compartment, and a motor supported adjacent said refrigerant coils and operatively connected with said driving means.

8. In refrigerating apparatus for domestic use, the combination with an ice tray receiving chamber having a front opening through which ice trays may be introduced, of a dessert container fitting within said chamber, agitating means within said container, driving means for said agitating means disposed at the rear of said chamber, a refrigerant motor, connections between said refrigerant motor and said driving means to operate the latter, a temperature responsive switch for controlling said motor, a by-pass for said switch, and means responsive to increase in the load on said motor for rendering said by-pass ineffective.

9. In refrigerating apparatus, the combination with a refrigerating unit comprising a freezing compartment, a refrigerant motor, and a switch responsive to temperature conditions within the unit for automatically controlling said motor, of a dessert container for introduction within said freezing compartment, agitating means within said container, a driving connection between said motor and said agitating means, a by-pass for said switch, and means responsive to increase in load on said motor for rendering said by-pass inoperative.

10. In refrigerating apparatus, the combination with a refrigerating unit comprising a freezing compartment, a refrigerant motor, and a switch responsive to temperature conditions within the unit for automatically controlling said motor, of a dessert container for introduction within said freezing compartment, agitating means within said container, a driving connection between said motor and said agitating means, a by-pass for said switch, a switch manually operable to one position for rendering said by-pass operative, and means responsive to increase in load on said motor for operating said switch to a second position to render said by-pass operative.

11. In refrigerating apparatus, the combination with a refrigerating unit comprising a freezing compartment, a refrigerant motor, and a switch responsive to temperature conditions within the unit for automatically controlling said motor, of a dessert container for introduction within said freezing compartment, agitating means within said container, a driving connection between said motor and said agitating means, a by-pass for said switch, a switch manually operable to one position for rendering said by-pass operative, means responsive to increase in load on said motor for operating said switch to a second position to render said by-pass operative, and a signal associated with said switch and rendered active upon movement of the latter to the said second position.

12. In refrigerating apparatus for domestic use, the combination with an ice tray receiving chamber having a front opening through which ice trays may be introduced, of a dessert freezer fitting within said chamber, a driving shaft supported for rotation about a fixed axis at the rear of said chamber, and coacting mechanical clutch members detachable by relative axial movement operatively associated with said shaft and freezer respectively, said clutch members being so relatively positioned that said freezer may be placed in operative relation with said driving shaft by introduction of the freezer within the chamber.

BERTRAM Y. KINZEY.